US011113496B1

(12) United States Patent
Zhou et al.

(10) Patent No.: US 11,113,496 B1
(45) Date of Patent: Sep. 7, 2021

(54) FINGERPRINT RECOGNITION DRIVING CIRCUIT

(71) Applicant: Wuhan China Star Optoelectronics Technology Co., Ltd., Hubei (CN)

(72) Inventors: Yongxiang Zhou, Hubei (CN); Yanqing Guan, Hubei (CN); Chao Tian, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/960,568

(22) PCT Filed: Jun. 3, 2020

(86) PCT No.: PCT/CN2020/094223
§ 371 (c)(1),
(2) Date: Jul. 8, 2020

(30) Foreign Application Priority Data

May 6, 2020 (CN) .......................... 202010374116.7

(51) Int. Cl.
*G06K 9/00* (2006.01)
*G06K 9/20* (2006.01)

(52) U.S. Cl.
CPC ......... *G06K 9/00013* (2013.01); *G06K 9/209* (2013.01)

(58) Field of Classification Search
CPC ...... G06K 9/00013; G06K 9/209; G09G 3/36; G09G 3/20; G09G 3/3677; G09G 2330/02; G09G 2300/0408; G09G 2310/0286; G11C 19/28
See application file for complete search history.

(56) References Cited

U.S. PATENT DOCUMENTS

| 2017/0270879 | A1* | 9/2017 | Han | ..................... G09G 3/3648 |
| 2019/0012518 | A1* | 1/2019 | Yang | ..................... G06F 3/0443 |
| 2019/0164509 | A1* | 5/2019 | Yoshida | ..................... G09G 3/36 |

* cited by examiner

*Primary Examiner* — Abhishek Sarma

(57) ABSTRACT

The present application provides a fingerprint recognition driving circuit, comprising: a cascade signal line; and a plurality of driving regions, wherein each of the driving regions is provided with a cascade unit and a plurality of first GOA driving units, each of the cascade units is connected to the cascade signal line to turn on the first GOA driving unit of a first stage in a corresponding driving region according to a cascade signal, and each of the cascade units is also configured to output an ON signal to the cascade unit of a next stage to turn on the cascade unit of the next stage.

16 Claims, 3 Drawing Sheets

FINGERPRINT RECOGNITION DRIVING CIRCUIT

RELATED APPLICATIONS

This application is a National Phase of PCT Patent Application No. PCT/CN2020/094223 having International filing date of Jun. 3, 2020, which claims the benefit of priority of Chinese Patent Application No. 202010374116.7 filed on May 6, 2020. The contents of the above applications are all incorporated by reference as if fully set forth herein in their entirety.

FIELD AND BACKGROUND OF THE INVENTION

The present application relates to the field of fingerprint recognition technology, and in particular to a fingerprint recognition driving circuit.

An existing fingerprint driving scheme uses different levels of signal transmission lines to control different partition fingerprint gate driver on array (GOA) circuits. First, a display panel is used to locate an approximate location of a fingerprint, and then a certain partition is chosen to be opened, so that there is no need to perform a full-board fingerprint scan, thereby preventing a significant increase in processing time. Then, partition 1 is scanned by turning on a first-stage signal transmission line. Other partitions where an STV signal is not turned on do not work. In this case, a number of cascade signal lines increases significantly, which increases a width of a frame. In addition, an increase in size of the display panel or a smaller division of a number of divisions will increase the number of cascade signal lines, which is not conducive to increasing screen ratio.

SUMMARY OF THE INVENTION

The purpose of an embodiment of the present application is to provide a fingerprint recognition driving circuit, which can improve the screen-to-body ratio.

The embodiment of the present application provides a fingerprint recognition driving circuit, comprising:

a cascade signal line configured to provide a cascade signal;

a plurality of driving regions, wherein each of the driving regions is provided with a cascade unit and a plurality of first gate driver on array (GOA) driving units, the cascade units of the plurality of driving regions are cascaded in sequence, and the plurality of first GOA driving units in a same driving region are cascaded in sequence;

wherein each of the cascade units is connected to the cascade signal line to turn on the first GOA driving unit of a first stage in a corresponding driving region according to the cascade signal, and each of the first GOA driving units is configured to drive a plurality of fingerprint identification units of a corresponding row;

each of the cascade units is also configured to output an ON signal to the cascade unit of a next stage to turn on the cascade unit of the next stage;

the cascade unit comprises a second GOA driving unit and a switch unit;

the second GOA driving unit of each of the cascade units is connected to the second GOA driving unit of the cascade unit of the next stage to output an ON signal to the second GOA driving unit of the cascade unit of the next stage, so that the second GOA driving unit of the cascade unit of the next stage is turned on;

an input end of the switch unit is connected to the cascade signal line, and the second GOA driving unit of each of the cascade units is connected to a control end of the switch unit to output an ON signal to the switch unit to turn on the switch unit, so that the switch unit outputs a cascade signal to the first GOA driving unit of the first stage in the corresponding driving region; and the first GOA driving unit and the second GOA driving unit have a same circuit structure.

In the fingerprint recognition driving circuit described in the embodiment of the present application, the switch unit is a thin film field effect transistor.

In the fingerprint recognition driving circuit described in the embodiment of the present application, the first GOA driving unit comprises a pull-up control module, a pull-up module, a pull-down module, and a pull-down maintenance module;

an input end of the pull-up control module is connected to a first level signal, an output end of the pull-up control module and a control end of the pull-up module are connected to a point Q, one end of the pull-up module is connected to a clock signal, and an output end of the pull-up module serves as an output port of the first GOA driving unit;

an input end of the pull-down module is connected to the output end of the pull-up module, an output end of the pull-down module is connected to a preset low-level line, a control end of the pull-down module is connected to an output end of the pull-down maintenance module, and a control end of the pull-down maintenance module receives the first level signal and a second level signal and outputs a pull-down maintenance signal to the control end of the pull-down module under control of the first level signal and the second level signal.

In the fingerprint recognition driving circuit described in the embodiment of the present application, the first GOA driving unit further comprises a first capacitor, one end of the first capacitor is connected to the point Q, and the other end of the first capacitor is connected to a preset low voltage line.

In the fingerprint recognition driving circuit described in the embodiment of the present application, the pull-up module comprises a seventh MOS tube and a ninth MOS tube;

an input end of the seventh MOS tube is connected to the point Q, an output end of the seventh MOS tube is connected to a control end of the ninth MOS tube, and an input end of the ninth MOS tube is connected to the clock signal, an output end of the ninth MOS tube is connected to the input end of the pull-down module, and a control end of the seventh MOS tube is connected to a preset high-level signal.

In the fingerprint recognition driving circuit described in the embodiment of the present application, the pull-down module comprises a tenth MOS tube, an input end of the tenth MOS tube is connected to the output end of the pull-up module, an output end of the tenth MOS tube is connected to a preset low voltage line, and a control end of the tenth MOS tube is connected to the pull-down maintenance module.

In the fingerprint recognition driving circuit described in the embodiment of the present application, the pull-down maintenance module comprises a second MOS tube, a third MOS tube, a fourth MOS tube, a fifth MOS tube, a sixth MOS tube, and an eighth MOS tube;

an input end of the second MOS tube is connected to a control end of the fourth MOS tube and connected to the second level signal, and an output end of the second MOS tube is connected to a control end of the sixth MOS tube and the point Q, a control end of the second MOS tube is connected to an output end of the first GOA drive unit of an (n+2)th stage, an input end of the third MOS tube receives a clock signal of an (n+1)th stage, an input end of the fourth MOS tube receives a clock signal of an (n−1)th stage, a control end of the third MOS tube receives the first level signal, an output end of the third MOS tube is connected to an output end of the fourth MOS tube and a control end of the eighth MOS tube, an input end of the eighth MOS tube receives a high-level signal, and an output end of the eighth MOS tube, an input end of the sixth MOS tube, and the control end of the pull-down module are connected to a point P.

In the fingerprint recognition driving circuit described in the embodiment of the present application, the fingerprint recognition driving circuit further comprises a reset MOS tube, an input end of the reset MOS tube is connected to a control end and receives a reset signal, and an output end of the reset MOS tube is connected to the point P.

The embodiment of the present application also provides a fingerprint recognition driving circuit, comprising:

a cascade signal line configured to provide a cascade signal;

a plurality of driving regions, wherein each of the driving regions is provided with a cascade unit and a plurality of first gate driver on array (GOA) driving units, the cascade units of the plurality of driving regions are cascaded in sequence, and the plurality of first GOA driving units in a same driving region are cascaded in sequence;

wherein each of the cascade units is connected to the cascade signal line to turn on the first GOA driving unit of a first stage in a corresponding driving region according to the cascade signal, and each of the first GOA driving units is configured to drive a plurality of fingerprint identification units of a corresponding row;

each of the cascade units is also configured to output an ON signal to the cascade unit of a next stage to turn on the cascade unit of the next stage.

In the fingerprint recognition driving circuit described in the embodiment of the present application, the cascade unit comprises a second GOA driving unit and a switch unit;

the second GOA driving unit of each of the cascade units is connected to the second GOA driving unit of the cascade unit of the next stage to output an ON signal to the second GOA driving unit of the cascade unit of the next stage, so that the second GOA driving unit of the cascade unit of the next stage is turned on;

an input end of the switch unit is connected to the cascade signal line, and the second GOA driving unit of each of the cascade units is connected to a control end of the switch unit to output an ON signal to the switch unit to turn on the switch unit, so that the switch unit outputs a cascade signal to the first GOA driving unit of the first stage in the corresponding driving region.

In the fingerprint recognition driving circuit described in the embodiment of the present application, the switch unit is a thin film field effect transistor.

In the fingerprint recognition driving circuit described in the embodiment of the present application, the first GOA driving unit and the second GOA driving unit have a same circuit structure.

In the fingerprint recognition driving circuit described in the embodiment of the present application, the first GOA driving unit comprises a pull-up control module, a pull-up module, a pull-down module, and a pull-down maintenance module;

an input end of the pull-up control module is connected to a first level signal, an output end of the pull-up control module and a control end of the pull-up module are connected to a point Q, one end of the pull-up module is connected to a clock signal, and an output end of the pull-up module serves as an output port of the first GOA driving unit;

an input end of the pull-down module is connected to the output end of the pull-up module, an output end of the pull-down module is connected to a preset low-level line, a control end of the pull-down module is connected to an output end of the pull-down maintenance module, and a control end of the pull-down maintenance module receives the first level signal and a second level signal and outputs a pull-down maintenance signal to the control end of the pull-down module under control of the first level signal and the second level signal.

In the fingerprint recognition driving circuit described in the embodiment of the present application, the first GOA driving unit further comprises a first capacitor, one end of the first capacitor is connected to the point Q, and the other end of the first capacitor is connected to a preset low voltage line.

In the fingerprint recognition driving circuit described in the embodiment of the present application, the pull-up module comprises a seventh MOS tube and a ninth MOS tube;

an input end of the seventh MOS tube is connected to the point Q, an output end of the seventh MOS tube is connected to a control end of the ninth MOS tube, and an input end of the ninth MOS tube is connected to the clock signal, an output end of the ninth MOS tube is connected to the input end of the pull-down module, and a control end of the seventh MOS tube is connected to a preset high-level signal.

In the fingerprint recognition driving circuit described in the embodiment of the present application, the pull-down module comprises a tenth MOS tube, an input end of the tenth MOS tube is connected to the output end of the pull-up module, an output end of the tenth MOS tube is connected to a preset low voltage line, and a control end of the tenth MOS tube is connected to the pull-down maintenance module.

In the fingerprint recognition driving circuit described in the embodiment of the present application, the pull-down maintenance module comprises a second MOS tube, a third MOS tube, a fourth MOS tube, a fifth MOS tube, a sixth MOS tube, and an eighth MOS tube;

an input end of the second MOS tube is connected to a control end of the fourth MOS tube and connected to the second level signal, and an output end of the second MOS tube is connected to a control end of the sixth MOS tube and the point Q, a control end of the second MOS tube is connected to an output end of the first GOA drive unit of an (n+2)th stage, an input end of the third MOS tube receives a clock signal of an (n+1)th stage, an input end of the fourth MOS tube receives a clock signal of an (n−1)th stage, a control end of the third MOS tube receives the first level signal, an output end of the third MOS tube is connected to an output end of the fourth MOS tube and a control end of the eighth MOS tube, an input end of the eighth MOS tube receives a high-level signal, and an output end of the eighth MOS tube, an input end of the sixth MOS tube and the control end of the pull-down module are connected to a point P.

In the fingerprint recognition driving circuit described in the embodiment of the present application, the fingerprint recognition driving circuit further comprises a reset MOS tube, an input end of the reset MOS tube is connected to a control end and receives a reset signal, and an output end of the reset MOS tube is connected to the point P.

The embodiment of the present application realizes cascade between each of the drive regions by using the cascade unit in each of the driving regions, and the opening of each of the first GOA driving units in the driving regions, so that only one cascade signal line is needed to control the plurality of driving regions, reducing a number of cascade signal lines, thereby reducing the width of the non-display region and improving the screen ratio.

BRIEF DESCRIPTION OF THE SEVERAL VIEWS OF THE DRAWINGS

In order to more clearly explain the technical solutions in the embodiments of the present application, the following will briefly introduce the drawings required in the description of the embodiments. Obviously, the drawings in the following description are only some embodiments of the present application. For those skilled in the art, without paying any creative work, other drawings can be obtained based on these drawings.

DESCRIPTION OF SPECIFIC EMBODIMENTS OF THE INVENTION

Figure 1:
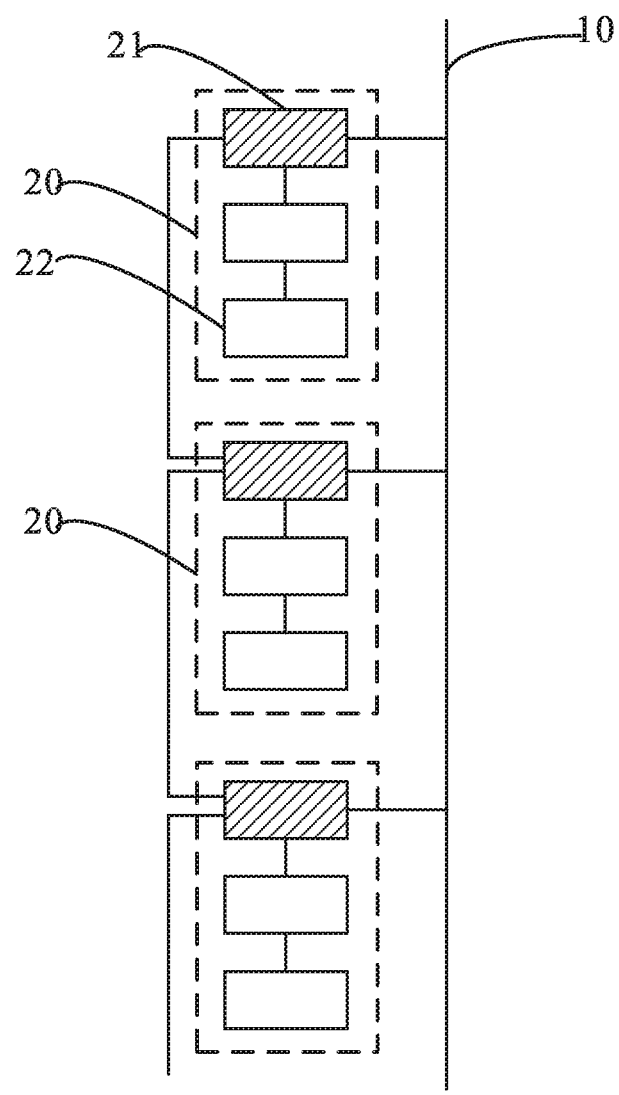
FIG. 1 is a first schematic structural diagram of a fingerprint recognition driving circuit provided by an embodiment of the present application.

The technical solutions in the embodiments of the present application will be described clearly and completely with reference to the drawings in the embodiments of the present application. Obviously, the described embodiments are only a part of the embodiments of the present application, but not all the embodiments. The components of the embodiments of the present application that are generally described and illustrated in the drawings herein can be arranged and designed in various configurations. Therefore, the following detailed description of the embodiments of the present application provided in the drawings is not intended to limit the scope of the claimed application, but merely represents selected embodiments of the present application. Based on the embodiments of the present application, all other embodiments obtained by those skilled in the art without making creative efforts fall within the scope of protection of the present application.

It should be noted that similar reference numerals and letters indicate similar items in the following drawings, therefore, once an item is defined in one drawing, there is no need to further define and explain it in subsequent drawings. Meanwhile, in the description of the present application, the terms "first", "second", etc. are only used to distinguish the description and cannot be understood as indicating or implying relative importance.

Please refer to FIG. 1, which is a first schematic structural diagram of a fingerprint recognition driving circuit provided by an embodiment of the present application. Wherein, the fingerprint recognition driving circuit comprises: a cascade signal line 10 and a plurality of driving regions 20.

The cascade signal line 10 is configured to provide a cascade signal. Each of the driving regions 20 is provided with a cascade unit 21 and a plurality of first gate driver on array (GOA) driving units 22; the cascade units 21 of the plurality of driving regions 20 are cascaded in sequence, and the plurality of first GOA driving units 22 in the same driving region 20 are cascaded in sequence. Each of the cascade units 21 is connected to the cascade signal line 10 to turn on the first GOA driving unit 22 of a first stage in the corresponding driving region 20 according to the cascade signal, and each of the first GOA driving units 22 is configured to drive a plurality of fingerprint identification units of a corresponding row; each of the cascade units 21 is also configured to output an ON signal to the cascade unit 21 of a next stage to turn on the cascade unit 21 of the next stage.

The embodiment of the present application realizes cascade between each of the drive regions 20 by using the cascade unit 21 in each of the driving regions 20, and the opening of each of the first GOA driving units 22 in the driving regions 20, so that only one cascade signal line is needed to control the plurality of driving regions 20, reducing a number of cascade signal line, thereby reducing the width of the non-display region and improving the screen ratio.

Figure 2:
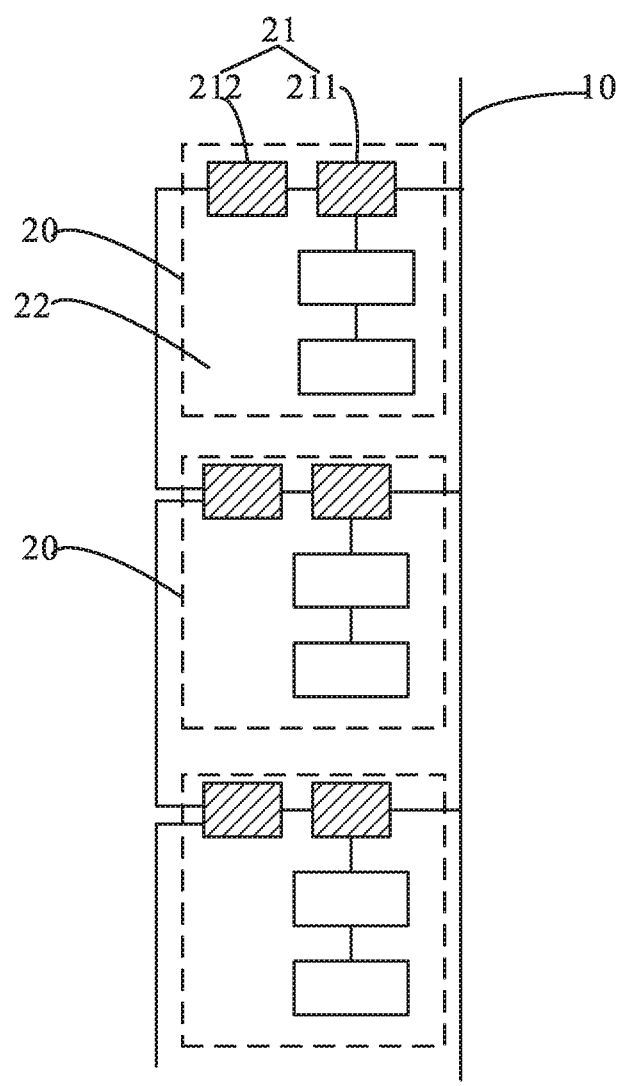
FIG. 2 is a second schematic structural diagram of the fingerprint recognition driving circuit provided by the embodiment of the present application.

Specifically, in some embodiments, please refer to FIG. 2, which is a second schematic structural diagram of the fingerprint recognition driving circuit provided by the embodiment of the present application. The cascade unit 21 comprises a second GOA driving unit 212 and a switch unit 211; the second GOA driving unit 212 of each of the cascade units 21 is connected to the second GOA driving unit 212 of the cascade unit 21 of the next stage to output an ON signal to the second GOA driving unit 212 of the cascade unit 21 of the next stage, so that the second GOA driving unit 212 of the cascade unit 21 of the next stage is turned on; an input end of the switch unit 211 is connected to the cascade signal line 10, and the second GOA driving unit 212 of each of the cascade units 21 is connected to a control end of the switch unit 211 to output an ON signal to the switch unit 211 to turn on the switch unit 211, so that the switch unit 211 outputs a cascade signal to the first GOA driving unit 22 of the first stage in the corresponding driving region 20, so that the corresponding first GOA driving unit 22 of the first stage start the scanning of the fingerprint recognition unit of the corresponding row. After the scanning of the row is completed, the first GOA driving unit 22 of the first stage sends the first GOA driving unit 22 of the second stage to start, thereby starting scanning the fingerprint recognition units in another row, until the fingerprint recognition units of the corresponding rows of the driving region 20 are completely scanned.

In some embodiments, the switch unit 211 is a thin film field effect transistor. For example, in this embodiment, the switch unit 211 is an N-type thin film field effect transistor, and of course, it may also use a P-type thin film field effect transistor.

Understandably, in this embodiment, the first GOA driving unit 22 and the second GOA driving unit 212 have the same circuit structure. Of course, it may not be the same.

Figure 3:
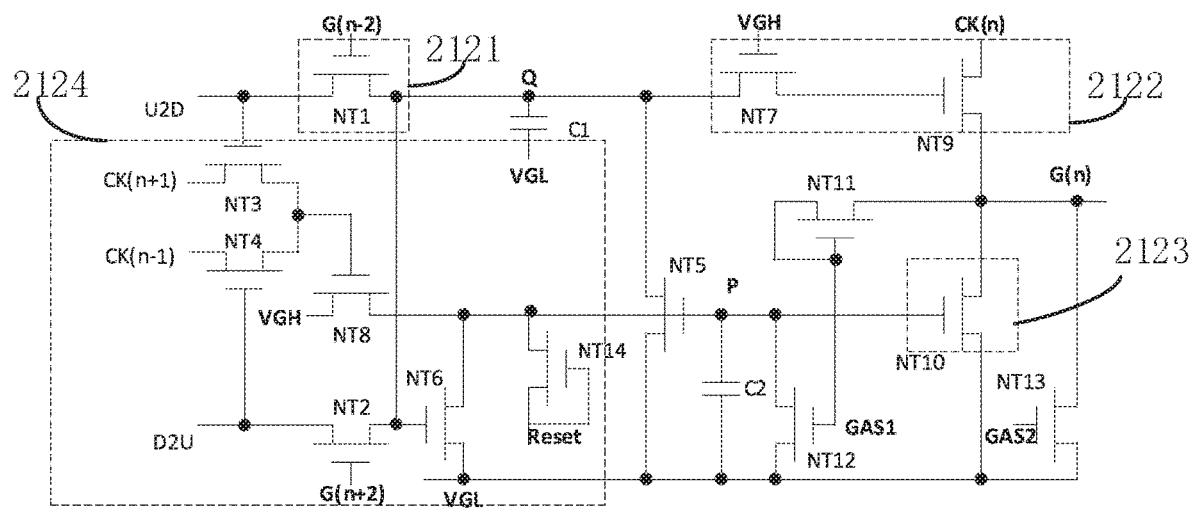
FIG. 3 is a third structural schematic diagram of the fingerprint recognition driving circuit provided by the embodiment of the present application.

Please refer to FIG. 3 at the same time, the specific circuit structure of the first GOA driving unit 22 will be described in detail below. The first GOA driving unit 22 comprises a pull-up control module 221, a pull-up module 222, a pull-down module 223, and a pull-down maintenance module 224.

An input end of the pull-up control module 221 is connected to a first level signal Gn−2, an output end of the pull-up control module 221 and a control end of the pull-up module 222 are connected to a point Q, and one end of the pull-up module 222 is connected to a clock signal CKn, and an output end of the pull-up module 222 serves as an output port of the first GOA driving unit 22. An input end of the pull-down module 223 is connected to the output end of the pull-up module 222, an output end of the pull-down module 223 is connected to a preset low-level line VGL, and a control end of the pull-down module 223 is connected to an output end of the pull-down maintenance module 224, a control end of the pull-down maintenance module 224 receives the first level signal U2D and a second level signal D2U, and outputs a pull-down maintenance signal to the control end of the pull-down module 223 under control of the first level signal and the second level signal.

Specifically, the first GOA driving unit 22 further comprises a first capacitor C1, one end of the first capacitor C1 is connected to the point Q, and the other end of the first capacitor C1 is connected to a preset low voltage line VGL.

The pull-up module 222 comprises a seventh MOS tube NT7 and a ninth MOS tube NT9; an input end of the seventh MOS tube is connected to the point Q, an output end of the seventh MOS tube NT7 is connected to a control end of the ninth MOS tube NT9, and an input end of the ninth MOS tube NT9 is connected to the clock signal, an output end of the ninth MOS tube NT9 is connected to the input end of the pull-down module 223, and a control end of the seventh MOS tube NT7 is connected to a preset high-level signal.

The pull-down module 223 comprises a tenth MOS tube NT10, an input end of the tenth MOS tube NT10 is connected to the output end of the pull-up module 221, an output end of the tenth MOS tube NT10 is connected to a preset low voltage line VGL, and a control end of the tenth MOS tube NT10 is connected to the pull-down maintenance module 224.

The pull-down maintenance module 224 comprises a second MOS tube NT2, a third MOS tube NT3, a fourth MOS tube NT4, a fifth MOS tube NT5, a sixth MOS tube NT6, and an eighth MOS tube NT8. An input end of the second MOS tube is connected to a control end of the fourth MOS tube and connected to the second level signal, and an output end of the second MOS tube is connected to a control end of the sixth MOS tube and the point Q, a control end of the second MOS tube is connected to an output end of the first GOA drive unit of an (n+2)th stage; an input end of the third MOS tube receives the clock signal of an (n+1)th stage, an input end of the fourth MOS tube receives the clock signal of an (n−1)th stage, a control end of the third MOS tube receives the first level signal, an output end of the third MOS tube is connected to an output end of the fourth MOS tube and a control end of the eighth MOS tube, an input end of the eighth MOS tube receives a high-level signal, and an output end of the eighth MOS tube, an input end of the sixth MOS tube, and the control end of the pull-down module are connected to a point P.

In some embodiments, the pull-down maintenance module 224 further comprises a reset MOS tube NT14, an input end of the reset MOS tube NT14 is connected to a control end and receives a reset signal reset, and an output end of the reset MOS tube NT14 is connected to the point P.

Understandably, in some embodiments, the pull-down maintenance module 224 further comprises a second capacitor C2, one end of the second capacitor C2 is connected to the point P, and the other end of the second capacitor C2 is connected to the preset low voltage line VGL.

Understandably, in some embodiments, the pull-down maintenance module 224 further comprises an eleventh MOS tube NT11, a twelfth MOS tube NT12, and a thirteenth MOS tube NT13. An input end of the eleventh MOS tube NT11 is connected to a common node of the pull-up module and the pull-down module. An output end and a control end of the eleventh MOS tube NT11 are connected to a control end of the twelfth MOS tube NT12, an input end of the twelfth MOS tube NT12 is connected to the point P, and an output end of the twelfth MOS tube NT12 is connected to the preset low voltage line VGL. An input end of the thirteenth MOS transistor NT13 is connected to the common node of the pull-up module and the pull-down module, and an output end of the thirteenth MOS transistor NT13 is connected to the preset low voltage line VGL. A control end of the thirteenth MOS tube NT13 is connected to the GAS2 signal, and a control end of the twelfth MOS tube NT12 is connected to the GAS1 signal. Both the GAS2 signal and the GAS1 signal are used to control the corresponding MOS tubes to be turned on or off, so as to realize voltage control of the output end of the first GOA driving unit.

Figure 4:
FIG. 4 is a schematic diagram of a specific circuit structure of the fingerprint recognition driving circuit provided by the embodiment of the present application.

As shown in FIG. 4, STV_1 to STV_5 are timing diagrams of turn-on signals output from the output terminals of the five driving regions, driving region 1 to driving region 5, respectively, and data_STV is a timing diagram of the signal transmission line of the stage. Only when the STV signal and the data_STV signal are turned on at the same time, that is, at a high level at the same time, can the corresponding first GOA drive unit be turned on to output the corresponding turn-on signal, so that the thin film transistor of the fingerprint recognition unit of the corresponding row is turned on, and the fingerprint scanning operation of the corresponding line is turned on.

In the present application, relational terms such as first and second are used only to distinguish one entity or operation from another entity or operation, and do not necessarily require or imply that any such actual relationship or sequence.

The above are only examples of the present application, and are not used to limit the protection scope of the present application. For those skilled in the art, the present application may have various modifications and changes. Any modification, equivalent replacement, improvement, etc. within the spirit and principle of this application should be included in the scope of protection of this application.

What is claimed is:
1. A fingerprint recognition driving circuit, comprising:
a cascade signal line configured to provide a cascade signal;
a plurality of driving regions, wherein each of the driving regions is provided with a cascade unit and a plurality of first gate driver on array (GOA) driving units, the cascade units of the plurality of driving regions are cascaded in sequence, and the plurality of first GOA driving units in a same driving region are cascaded in sequence;
wherein each of the cascade units is connected to the cascade signal line to turn on the first GOA driving unit of a first stage in a corresponding driving region according to the cascade signal, and each of the first GOA driving units is configured to drive a plurality of fingerprint identification units of a corresponding row;

each of the cascade units is also configured to output an ON signal to the cascade unit of a next stage to turn on the cascade unit of the next stage;

the cascade unit comprises a second GOA driving unit and a switch unit;

the second GOA driving unit of each of the cascade units is connected to the second GOA driving unit of the cascade unit of the next stage to output an ON signal to the second GOA driving unit of the cascade unit of the next stage, so that the second GOA driving unit of the cascade unit of the next stage is turned on;

an input end of the switch unit is connected to the cascade signal line, and the second GOA driving unit of each of the cascade units is connected to a control end of the switch unit to output an ON signal to the switch unit to turn on the switch unit, so that the switch unit outputs a cascade signal to the first GOA driving unit of the first stage in the corresponding driving region; and the first GOA driving unit and the second GOA driving unit have a same circuit structure, and the first GOA driving unit comprises a pull-up control module, a pull-up module, a pull-down module, and a pull-down maintenance module;

an input end of the pull-up control module is connected to a first level signal, an output end of the pull-up control module and a control end of the pull-up module are connected to a point Q, one end of the pull-up module is connected to a clock signal, and an output end of the pull-up module serves as an output port of the first GOA driving unit;

an input end of the pull-down module is connected to the output end of the pull-up module, an output end of the pull-down module is connected to a preset low-level line, a control end of the pull-down module is connected to an output end of the pull-down maintenance module, and a control end of the pull-down maintenance module receives the first level signal and a second level signal and outputs a pull-down maintenance signal to the control end of the pull-down module under control of the first level signal and the second level signal.

2. The fingerprint recognition driving circuit of claim 1, wherein the switch unit is a thin film field effect transistor.

3. The fingerprint recognition driving circuit of claim 1, wherein the first GOA driving unit further comprises a first capacitor, one end of the first capacitor is connected to the point Q, and the other end of the first capacitor is connected to a preset low voltage line.

4. The fingerprint recognition driving circuit of claim 1, wherein the pull-up module comprises a seventh MOS tube and a ninth MOS tube;

an input end of the seventh MOS tube is connected to the point Q, an output end of the seventh MOS tube is connected to a control end of the ninth MOS tube, and an input end of the ninth MOS tube is connected to the clock signal, an output end of the ninth MOS tube is connected to the input end of the pull-down module, and a control end of the seventh MOS tube is connected to a preset high-level signal.

5. The fingerprint recognition driving circuit of claim 1, wherein the pull-down module comprises a tenth MOS tube, an input end of the tenth MOS tube is connected to the output end of the pull-up module, an output end of the tenth MOS tube is connected to a preset low voltage line, and a control end of the tenth MOS tube is connected to the pull-down maintenance module.

6. The fingerprint recognition driving circuit of claim 1, wherein the pull-down maintenance module comprises a second MOS tube, a third MOS tube, a fourth MOS tube, a fifth MOS tube, a sixth MOS tube, and an eighth MOS tube;

an input end of the second MOS tube is connected to a control end of the fourth MOS tube and connected to the second level signal, and an output end of the second MOS tube is connected to a control end of the sixth MOS tube and the point Q, a control end of the second MOS tube is connected to an output end of the first GOA drive unit of an (n+2)th stage, an input end of the third MOS tube receives a clock signal of an (n+1)th stage, an input end of the fourth MOS tube receives a clock signal of an (n−1)th stage, a control end of the third MOS tube receives the first level signal, an output end of the third MOS tube is connected to an output end of the fourth MOS tube and a control end of the eighth MOS tube, an input end of the eighth MOS tube receives a high-level signal, and an output end of the eighth MOS tube, an input end of the sixth MOS tube, and the control end of the pull-down module are connected to a point P.

7. The fingerprint recognition driving circuit of claim 6, wherein the fingerprint recognition driving circuit further comprises a reset MOS tube, an input end of the reset MOS tube is connected to a control end and receives a reset signal, and an output end of the reset MOS tube is connected to the point P.

8. A fingerprint recognition driving circuit, comprising:

a cascade signal line configured to provide a cascade signal;

a plurality of driving regions, wherein each of the driving regions is provided with a cascade unit and a plurality of first gate driver on array (GOA) driving units, the cascade units of the plurality of driving regions are cascaded in sequence, and the plurality of first GOA driving units in a same driving region are cascaded in sequence;

wherein each of the cascade units is connected to the cascade signal line to turn on the first GOA driving unit of a first stage in a corresponding driving region according to the cascade signal, and each of the first GOA driving units is configured to drive a plurality of fingerprint identification units of a corresponding row;

the first GOA driving unit comprises a pull-up control module, a pull-up module, a pull-down module, and a pull-down maintenance module;

an input end of the pull-up control module is connected to a first level signal, an output end of the pull-up control module and a control end of the pull-up module are connected to a point Q, one end of the pull-up module is connected to a clock signal, and an output end of the pull-up module serves as an output port of the first GOA driving unit; and an input end of the pull-down module is connected to the output end of the pull-up module, an output end of the pull-down module is connected to a preset low-level line, a control end of the pull-down module is connected to an output end of the pull-down maintenance module, and a control end of the pull-down maintenance module receives the first level signal and a second level signal and outputs a pull-down maintenance signal to the control end of the pull-down module under control of the first level signal and the second level signal;

each of the cascade units is also configured to output an ON signal to the cascade unit of a next stage to turn on the cascade unit of the next stage.

9. The fingerprint recognition driving circuit of claim 8, wherein the cascade unit comprises a second GOA driving unit and a switch unit;

the second GOA driving unit of each of the cascade units is connected to the second GOA driving unit of the cascade unit of the next stage to output an ON signal to the second GOA driving unit of the cascade unit of the next stage, so that the second GOA driving unit of the cascade unit of the next stage is turned on;

an input end of the switch unit is connected to the cascade signal line, and the second GOA driving unit of each of the cascade units is connected to a control end of the switch unit to output an ON signal to the switch unit to turn on the switch unit, so that the switch unit outputs a cascade signal to the first GOA driving unit of the first stage in the corresponding driving region.

10. The fingerprint recognition driving circuit of claim 9, wherein the switch unit is a thin film field effect transistor.

11. The fingerprint recognition driving circuit of claim 9, wherein the first GOA driving unit and the second GOA driving unit have a same circuit structure.

12. The fingerprint recognition driving circuit of claim 8, wherein the first GOA driving unit further comprises a first capacitor, one end of the first capacitor is connected to the point Q, and the other end of the first capacitor is connected to a preset low voltage line.

13. The fingerprint recognition driving circuit of claim 8, wherein the pull-up module comprises a seventh MOS tube and a ninth MOS tube;

an input end of the seventh MOS tube is connected to the point Q, an output end of the seventh MOS tube is connected to a control end of the ninth MOS tube, and an input end of the ninth MOS tube is connected to the clock signal, an output end of the ninth MOS tube is connected to the input end of the pull-down module, and a control end of the seventh MOS tube is connected to a preset high-level signal.

14. The fingerprint recognition driving circuit of claim 8, wherein the pull-down module comprises a tenth MOS tube, an input end of the tenth MOS tube is connected to the output end of the pull-up module, an output end of the tenth MOS tube is connected to a preset low voltage line, and a control end of the tenth MOS tube is connected to the pull-down maintenance module.

15. The fingerprint recognition driving circuit of claim 8, wherein the pull-down maintenance module comprises a second MOS tube, a third MOS tube, a fourth MOS tube, a fifth MOS tube, a sixth MOS tube, and an eighth MOS tube;

an input end of the second MOS tube is connected to a control end of the fourth MOS tube and connected to the second level signal, and an output end of the second MOS tube is connected to a control end of the sixth MOS tube and the point Q, a control end of the second MOS tube is connected to an output end of the first GOA drive unit of an (n+2)th stage, an input end of the third MOS tube receives a clock signal of an (n+1)th stage, an input end of the fourth MOS tube receives a clock signal of an (n−1)th stage, a control end of the third MOS tube receives the first level signal, an output end of the third MOS tube is connected to an output end of the fourth MOS tube and a control end of the eighth MOS tube, an input end of the eighth MOS tube receives a high-level signal, and an output end of the eighth MOS tube, an input end of the sixth MOS tube and the control end of the pull-down module are connected to a point P.

16. The fingerprint recognition driving circuit of claim 15, wherein the fingerprint recognition driving circuit further comprises a reset MOS tube, an input end of the reset MOS tube is connected to a control end and receives a reset signal, and an output end of the reset MOS tube is connected to the point P.

* * * * *